(12) United States Patent
Hahn et al.

(10) Patent No.: US 7,215,181 B2
(45) Date of Patent: May 8, 2007

(54) HIGH VOLTAGE GENERATOR CIRCUIT WITH RIPPLE STABILIZATION FUNCTION

(75) Inventors: Wook-Ghee Hahn, Gyeonggi-do (KR); Dae-Seok Byeon, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 139 days.

(21) Appl. No.: 11/025,765

(22) Filed: Dec. 28, 2004

(65) Prior Publication Data

US 2006/0061411 A1 Mar. 23, 2006

(30) Foreign Application Priority Data

Sep. 22, 2004 (KR) .................. 10-2004-0076034

(51) Int. Cl.
*G05F 1/10* (2006.01)
*H03L 7/00* (2006.01)

(52) U.S. Cl. ........................ 327/538; 327/160

(58) Field of Classification Search ........ 327/148, 327/157, 536–538, 540; 363/60
See application file for complete search history.

(56) References Cited

U.S. PATENT DOCUMENTS

| | | | | |
|---|---|---|---|---|
| 5,642,309 A | | 6/1997 | Kim et al. | ............. 365/185.22 |
| 5,757,216 A | * | 5/1998 | Murata | ...................... 327/156 |
| 6,061,270 A | | 5/2000 | Choi | ...................... 365/185.02 |
| 6,130,925 A | * | 10/2000 | Ichimaru et al. | ............. 375/376 |
| 6,335,881 B2 | | 1/2002 | Kim et al. | ............. 365/185.18 |
| 6,370,062 B2 | | 4/2002 | Choi | ...................... 365/185.23 |
| 6,639,475 B2 | * | 10/2003 | Ichimaru | ...................... 331/17 |
| 6,667,662 B2 | * | 12/2003 | Saito | ...................... 331/1 A |
| 6,781,469 B2 | * | 8/2004 | Ho et al. | ...................... 331/16 |
| 7,064,600 B1 | * | 6/2006 | Ming et al. | ............. 327/536 |

FOREIGN PATENT DOCUMENTS

| | | |
|---|---|---|
| JP | 06-153493 | 5/1994 |
| JP | 06-253532 | 9/1994 |
| JP | 2003-244940 | 8/2003 |
| KR | 95-57208 | 12/1995 |
| KR | 2003-0080643 | 10/2003 |

OTHER PUBLICATIONS

English language abstract of Korean Publication No. 95-57208.
English language abstract of Korean Publication No. 2003-0080643.
English language abstract of Japanese Publication No. 06-253532.
English language abstract of Japanese Publication No. 2003-244940.
English language abstract of Japanese Publication No. 06-153493.

\* cited by examiner

*Primary Examiner*—My-Trang Nu Ton
(74) *Attorney, Agent, or Firm*—Marger Johnson & McCollom, P.C.

(57) ABSTRACT

The present invention disclosed herein is a high voltage generator circuit. The high voltage generator circuit includes a charge pump and a pump clock signal generator. The pump clock signal is gated to the charge pump when the high voltage is below a target voltage. After the high voltage reaches the target voltage, the high voltage cyclically falls below the target voltage. After the high voltage reaches the target voltage, a pump clock generator block circuit limits the transmission of the pump clock signal so that only N clock signals are gate to the charge pump each cycle, where N is the number one or greater.

24 Claims, 6 Drawing Sheets

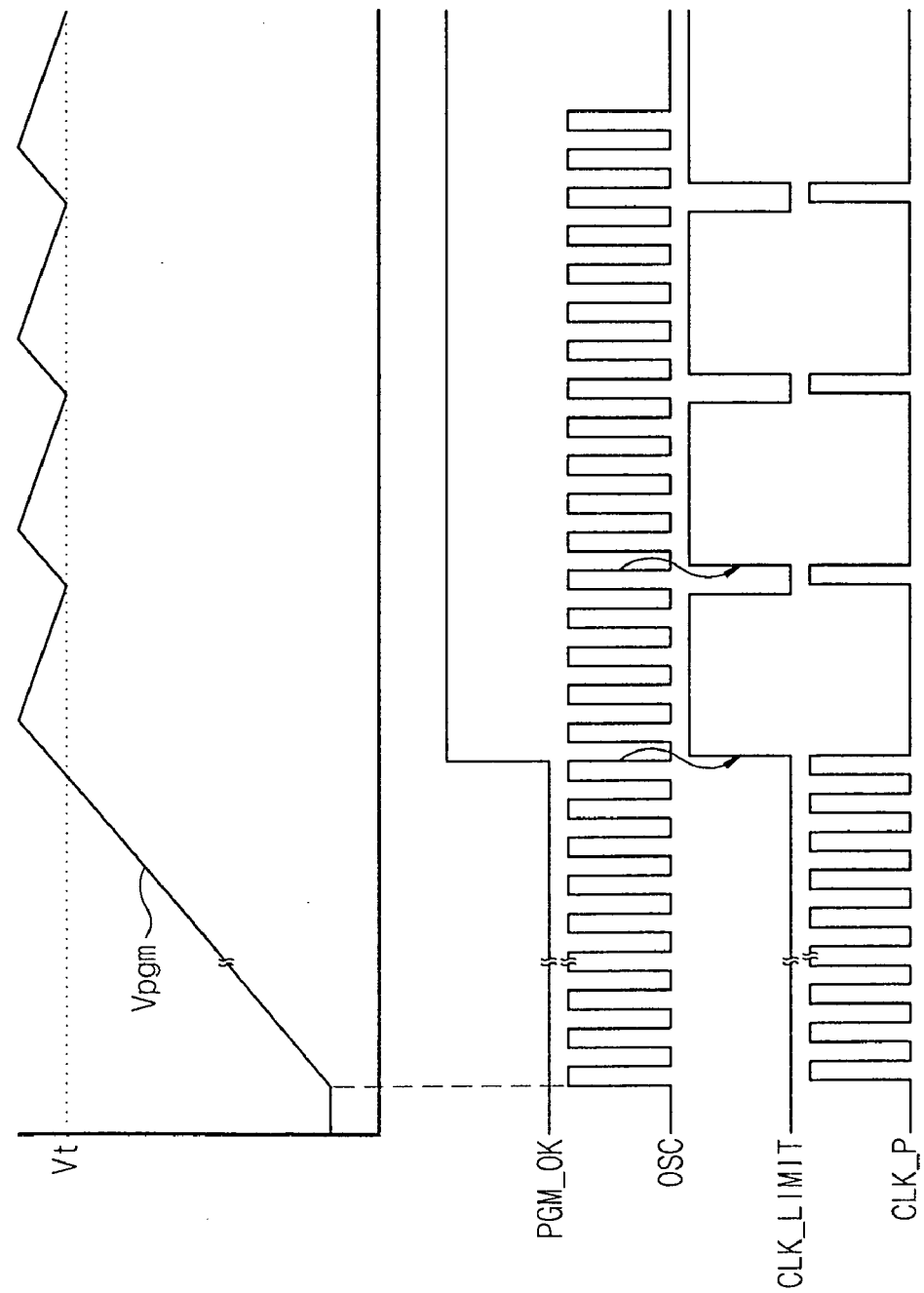

HIGH VOLTAGE GENERATOR CIRCUIT WITH RIPPLE STABILIZATION FUNCTION

This application claims priority from Korean Patent Application No. 2004-76034, filed on Sep. 22, 2004, the entire content of which is hereby incorporated herein by reference.

BACKGROUND OF THE INVENTION

1. Field of the Invention

This invention relates to semiconductor integration circuit devices, and more particularly, to semiconductor voltage generator circuits.

2. Description of the Related Art

Semiconductor memory devices can, in general, be characterized as either volatile or non-volatile. In volatile memory devices, information can be stored in two ways. First, in devices, such static random access memory (SRAM), information is stored by setting the logical state of a bi-stable flip-flop. Second, in devices, such as dynamic random access memory (DRAM), information is stored by charging a capacitor. In either case, the data is stored and can be read out as long as power is applied; however, the data is lost when the power is turned off.

Non-volatile semiconductor memory devices are capable of storing the data, even with the power turned off. MROM, PROM, EPROM, and EEPROM are examples of such devices. In non-volatile memory devices, data storage may be permanent or re-programmable, depending upon the technology used. Non-volatile memories are frequently used for program and microcode storage in a wide variety of applications such as in avionics, telecommunications, and consumer electronics. Devices such as Non-Volatile SRAM (nvSRAM) combine a single-chip volatile memory and a non-volatile memory. Such devices are sometimes used in systems that require a fast, re-programmable non-volatile memory. In addition, dozens of special memory architectures have evolved which contain additional logic to optimize performance for application-specific tacks.

In non-volatile semiconductor memory devices, since MROM, PROM, and EPROM it is relatively difficult for users to renew memory contents. On the other hand, an EEPROM is electrically erasable and readable. Hence, an EEPROM memory is frequently used in applications that require continuous renewal.

Flash EPROM (hereinafter referred to as "Flash Memory") is suitable for applications such as for use as a large capacity subsidiary memory device. The reason for this is that the flash memory has a higher integration compared to conventional EEPROM memory. NAND-type flash memories have an even higher integration than NOR flash memories.

In flash memories, if memory cells are programmed once, the programmed memory cell must be erased in order to store new data. That is, flash memories do not support an over-write function. Various methods for programming and erasing flash memories are disclosed in various patents such as in U.S. Pat. No. 6,061,270 entitled in "METHOD FOR PROGRAMMING A NON-VOLATILE MEMORY DEVICE WITH PROGRAM DISTURB CONTROL", U.S. Pat. No. 6,335,881 entitled in "METHOD FOR PROGRAMMING A FLASH MEMORY DEVICE, and U.S. Pat. No. 6,370,062 entitled in "NAND-TYPE FLASH MEMORY DEVICE AND METHOD OF OPERATING THE SAME".

In order to erase or program memory cells in some non-volatile memory devices, a higher voltage than the power voltage is required (hereinafter referred to as "a high voltage"). An exemplary high voltage generator circuit is disclosed in U.S. Pat. No. 5,642,309 entitled in "AUTO-PROGRAM CIRCUIT IN A NON-VOLATILE SEMICONDUCTOR MEMORY DEVICE".

FIG. 1 is a schematic block diagram of a prior art high voltage generator circuit. The prior art high voltage generator circuit 10 shown in FIG. 1 includes a charge pump 11, a voltage divider 12, a comparator 13, an oscillator 14, and a clock driver 15. The high voltage Vpgm generated by the charge pump 11 is divided by voltage divider 12. The divided voltage Vdvd is compared with a reference voltage by the comparator 13. The oscillation signal OSC from the oscillator 14 is provided to the charge pump 11 by circuit 15, based on the result of the comparison.

The charge pump 11 generates the voltage Vpgm in response to a clock signal CLK from the clock driver 15. However, the transmission of the CLK to the charge pump 11 is turned on and off according to the result of a comparison between the divided voltage and the reference voltage.

In a control mode, the clock signal CLK is generated until the high voltage Vpgm reaches a target level Vt. Then the charge pump 11 is turned off. There is a delay in turning off the charge pump due to the response speed (time) of the comparator 13. Such a delay is generally inevitable in a high voltage generator circuit employing feedback control methods such as those shown in FIG. 1.

Due to the delay in turning off the clock signal CLK, a ripple phenomenon occurs. That is, the high voltage is not maintained regularly. The reason that the irregular ripple occurs is that the clock signal CLK is not regularly provided to the charge pump 11. This is illustrated in FIG. 2. After the high voltage Vpgm reaches the target voltage Vt, the clock signal CLK is only periodically provided to the charge pump 11. Therefore, as shown in FIG. 2, a ripple of the high voltage Vpgm occurs. In a non-volatile memory device that includes a high voltage generator circuit such as that described above, due to irregular ripples, the threshold voltage profile becomes wide. This is undesirable.

SUMMARY OF THE INVENTION

An object of the present invention provides a high voltage generator circuit which includes a charge pump for generating a high voltage in response to a pump clock signal. A pump clock block circuit is also provided. After the high voltage initially reaches a target voltage, the pump clock block circuit limits the transmission of the pump clock signal so that the clock signal is only outputted to the charge pump for N clock cycles each time the high voltage goes below a target value (where N is one or more).

In an exemplary embodiment, after the high voltage reaches the target voltage, the pump clock block circuit limits the pump clock signal so that it is only outputted to the charge pump once each time the high voltage goes below the target voltage.

As a result, a high voltage generator circuit capable of generating a high voltage with a small amount of ripple can be provided.

BRIEF DESCRIPTION OF THE DRAWINGS

FIG. 6 is a timing diagram illustrating an operation of the high voltage generator circuit according to the present invention.

DETAILED DESCRIPTION OF A PREFERRED EMBODIMENT

The present invention will be described more fully hereinafter with reference to the accompanying drawings in which exemplary embodiments of the invention are shown.

While the present invention has been described in connection with specific and preferred embodiments thereof, various changes and modifications can be made in the embodiments without departing from the spirit and scope of the present invention. It should be appreciated that the scope of the invention is not limited to the detailed description of the invention herein, which is intended merely to be illustrative, but rather the invention comprehends the subject matter defined by the claims.

Figure 1:
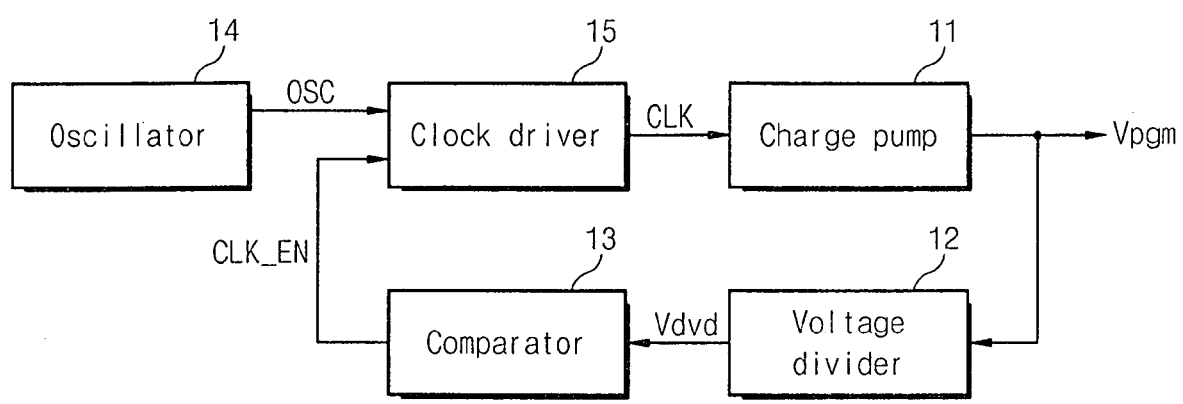
FIG. 1 is a block diagram schematically showing a high voltage generator circuit according to the prior art.
Figure 2:
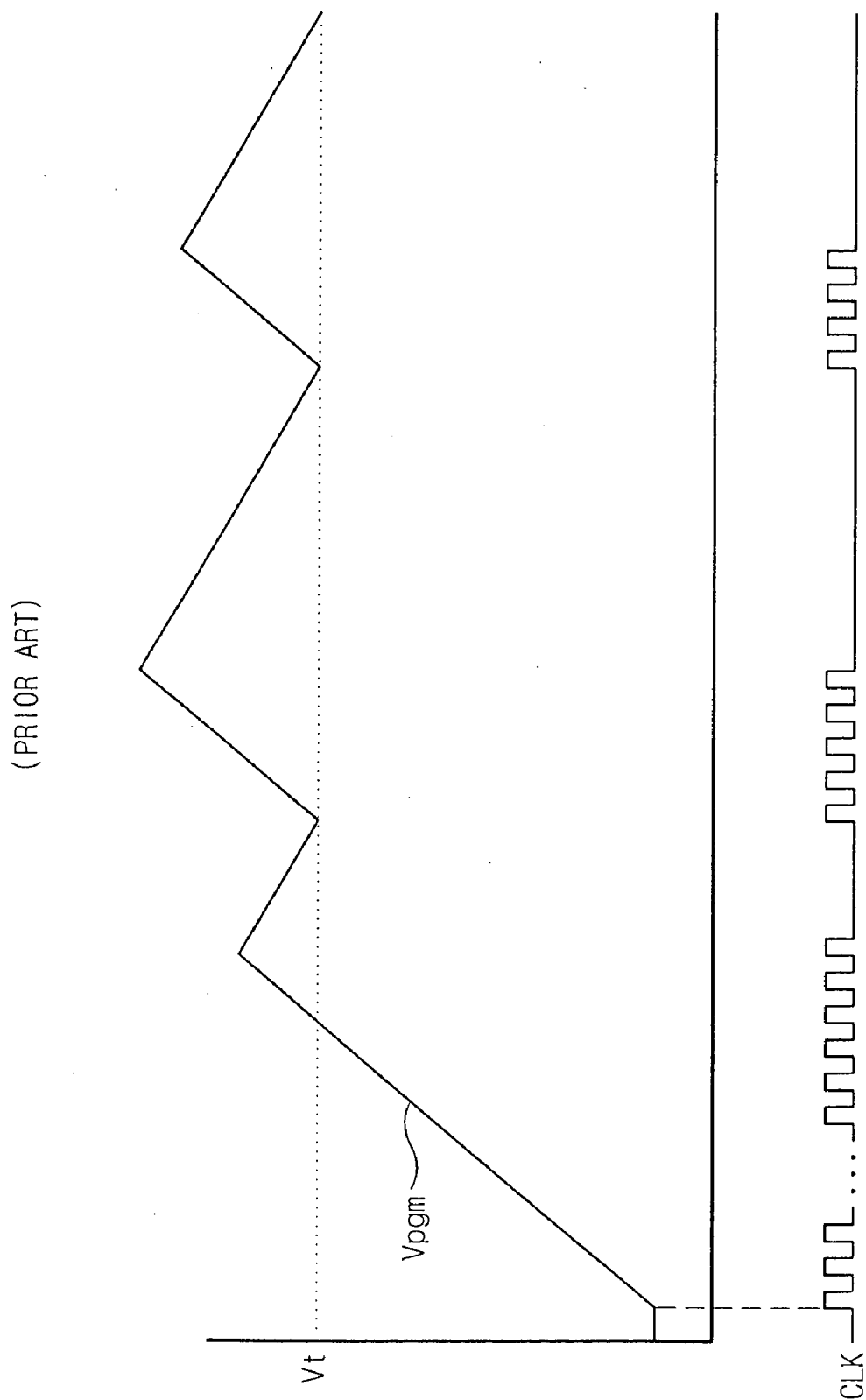
FIG. 2 shows the clock signal generated when a high voltage is generated in the prior art circuit.
Figure 3:
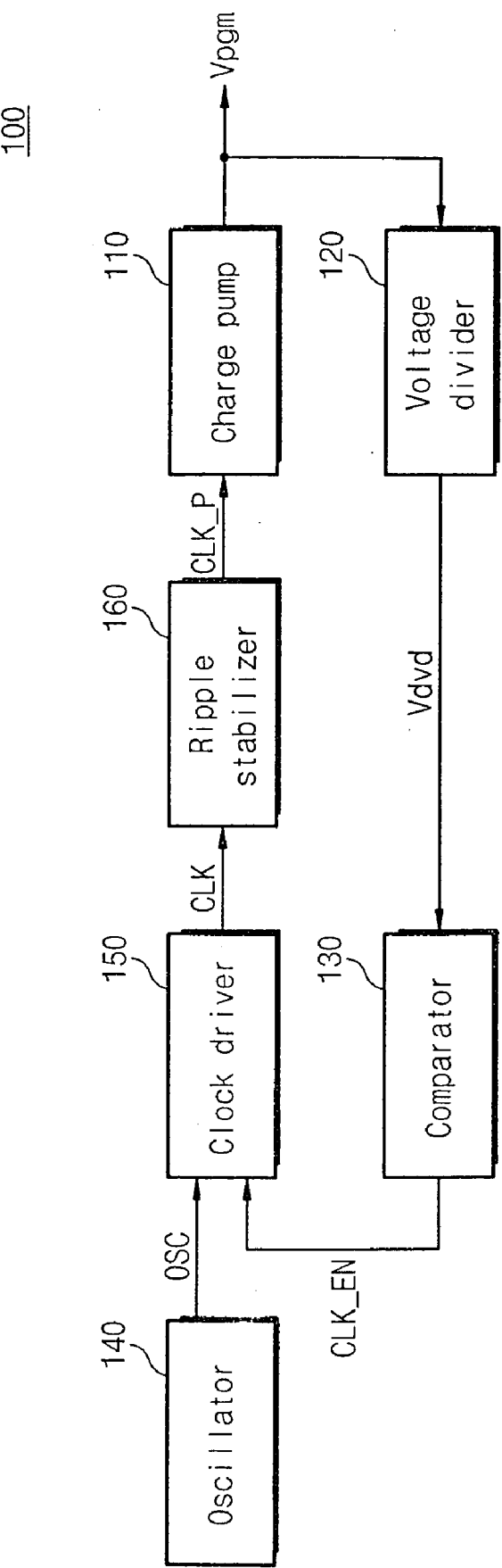
FIG. 3 is a block diagram schematically showing a high voltage generator circuit according to the present invention.

FIG. 3 is a block diagram schematically showing a high voltage generator circuit according to one embodiment of the present invention.

The high voltage generator circuit 100 shown in FIG. 3 includes a charge pump 110, a voltage divider 120, a comparator 130, an oscillator 140, a clock driver 150, and a ripple stabilizer 160. The charge pump 110 generates a high voltage Vpgm in response to a pump clock signal CLK_P from the ripple stabilizer 160. The charge divider 120 divides a high voltage Vpgm that is generated by the charge pump 110. The comparator 130 determines if the divide voltage Vdvd is lower than a reference voltage. The comparator 130 activates a clock enable signal CLK_EN according to the result of the comparison. For example, when the divide voltage Vdvd from the voltage divider is lower than the reference voltage, the comparator 130 activates the clock enable signal CLK_EN. When the divide voltage Vdvd is higher than a reference voltage, the comparator 130 inactivates the clock enable signal CLK_EN. The clock driver 150 gates the oscillation signal OSC from oscillator 140 to the ripple stabilizer as a clock signal CLK in response to the clock enable signal CLK_EN. When the clock enable signal CLK_EN is inactivated, the oscillation signal OSC of the oscillator 140 is cut off from the ripple stabilizer.

The ripple stabilizer 160 limits the clock signal CLK from the clock driver 150 according to whether a high voltage Vpgm reaches a target voltage or not, That is, the ripple stabilizer 160 transfers a clock signal CLK from the clock driver 150 to the charge pump 110 until the high voltage Vpgm reaches the target voltage. After the high voltage Vpgm reaches the target voltage, the ripple stabilizer 160 limits the clock signal CLK transferred to the charge pump 110 by as much as a predetermined clock cycle (e.g., a first clock cycle). As a result, the clock cycle of the pump clock signal CLK provided to the charge pump 110 after the high voltage Vpgm reaches the target voltage is maintained constant. Thus, it is possible to minimize the ripple of the high voltage Vpgm.

The circuit can be divided into a "pump clock generator block and a "clock enable signal generator". The "pump clock generator block" includes the voltage divider 120, the comparator 130, the oscillator 140, the clock driver 150, and the ripple stabilizer 160. The pump clock generator block generates a pump clock signal CLK_P in response to the high voltage Vpgm. The "clock enable signal generator" includes the voltage divider 120 and the comparator 130. The clock enable signal generator generates a clock enable signal, CLK_EN according to whether or not the high voltage Vpgm is lower than the reference voltage.

Figure 4:
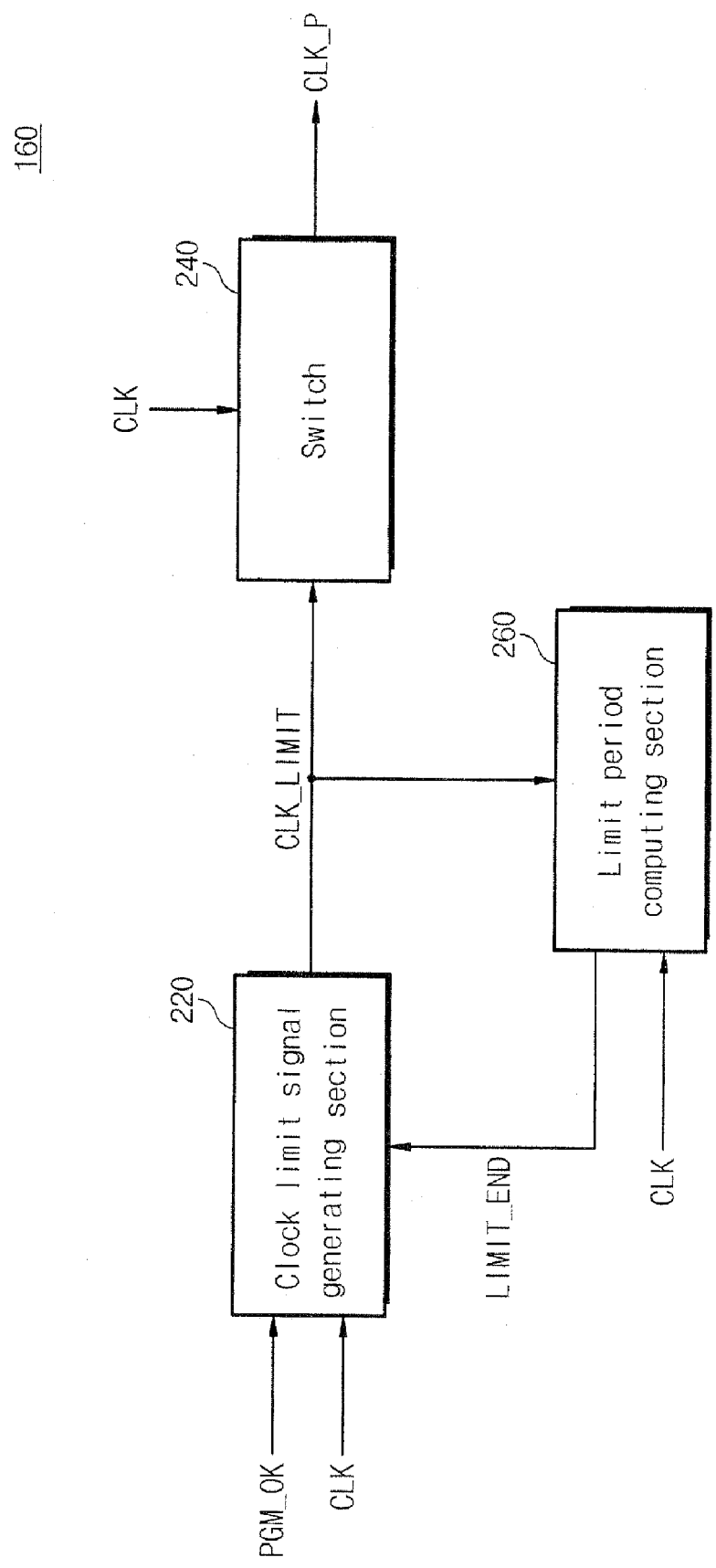
FIG. 4 is a block diagram schematically showing a ripple stabilizer of FIG. 3.

FIG. 4 is a block diagram schematically showing details of the ripple stabilizer 160 shown in FIG. 3. With reference to 11G. 4, the ripple stabilizer 160 includes a clock limit signal generating section 220, a limit period computing section 260, and a switch 240.

The clock limit signal generating section 220 generates a clock limit signal CLK_LIMIT in response to a flag signal PGM_OK and a clock signal CLK. The flag signal PGM_OK is a signal representing whether the high voltage Vpgm reaches the target voltage. The flag signal PGM_OK may be generated using an output signal of the comparator of FIG. 3. This can be accomplished by latching the output signal of the comparator 130 when the high voltage reaches the target voltage. In addition, the flag signal PGM_OK may be generated in a control logic of a non-volatile memory device (not shown). If the high voltage Vpgm is lower than the target voltage, the clock limit signal generating section 220 inactivates the clock limit signal. In the event that the high voltage Vpgm reaches the target voltage, the clock limit signal generating section 220 is synchronized with the clock signal CLK to activate the clock limit signal CLK_LIMIT.

The switch 240 selectively cuts off the clock signal CLK in response to the clock limit signal CLK_LIMIT. The selectively cut off signal is transferred to the charge pump 110 as the pump clock signal CLK_P. For example, the switch 240 outputs the clock signal CLK as the pump clock signal CLK_P in response to an inactivation of the clock limit signal CLK_LIMIT without limitation. The switch 240 limits the clock signal CLK in response to an activation of the clock limit signal CLK_LIMIT. As a result, the clock signal CLK as the pump clock signal CLK_P is transferred to the charge pump 110 as much as a predetermined clock cycle later. The limit period computing section 260 generates a limit end signal LIMIT_END in response to the clock limit signal CLK_LIMIT and the clock signal CLK. For instance, the limit period computing section 260 activates the limit end signal LIMIT_END after the clock limit signal CLK_LIMIT, and a predetermined time passes. The clock limit signal generating section 220 inactivates the clock limit signal CLK_LIMIT in response to an activation of the limit end signal LIMIT_END After the high voltage Vpgm reaches the target voltage, the clock signal CLK is outputted as the pump clock signal CLK_P through the switch 240 during an inactivation section of the clock limit signal CLK_LIMIT. In other words, the clock signal CLK is outputted as the pump clock signal CLK_P without limitation during the inactivation section of the clock limit signal CLK_LIMIT. To the contrary, the clock signal CLK is limitedly (by as much as a constant clock cycle) and outputted as the pump clock signal CLK_P during the activation section of clock limit signal CLK_LIMIT. As a result, a clock cycle of the pump clock signal CLK_P provided to the charge pump 110 of FIG. 3 is maintained constant. As a result, it is possible to maintain as well as minimize a ripple of the high voltage Vpgm.

Figure 5:
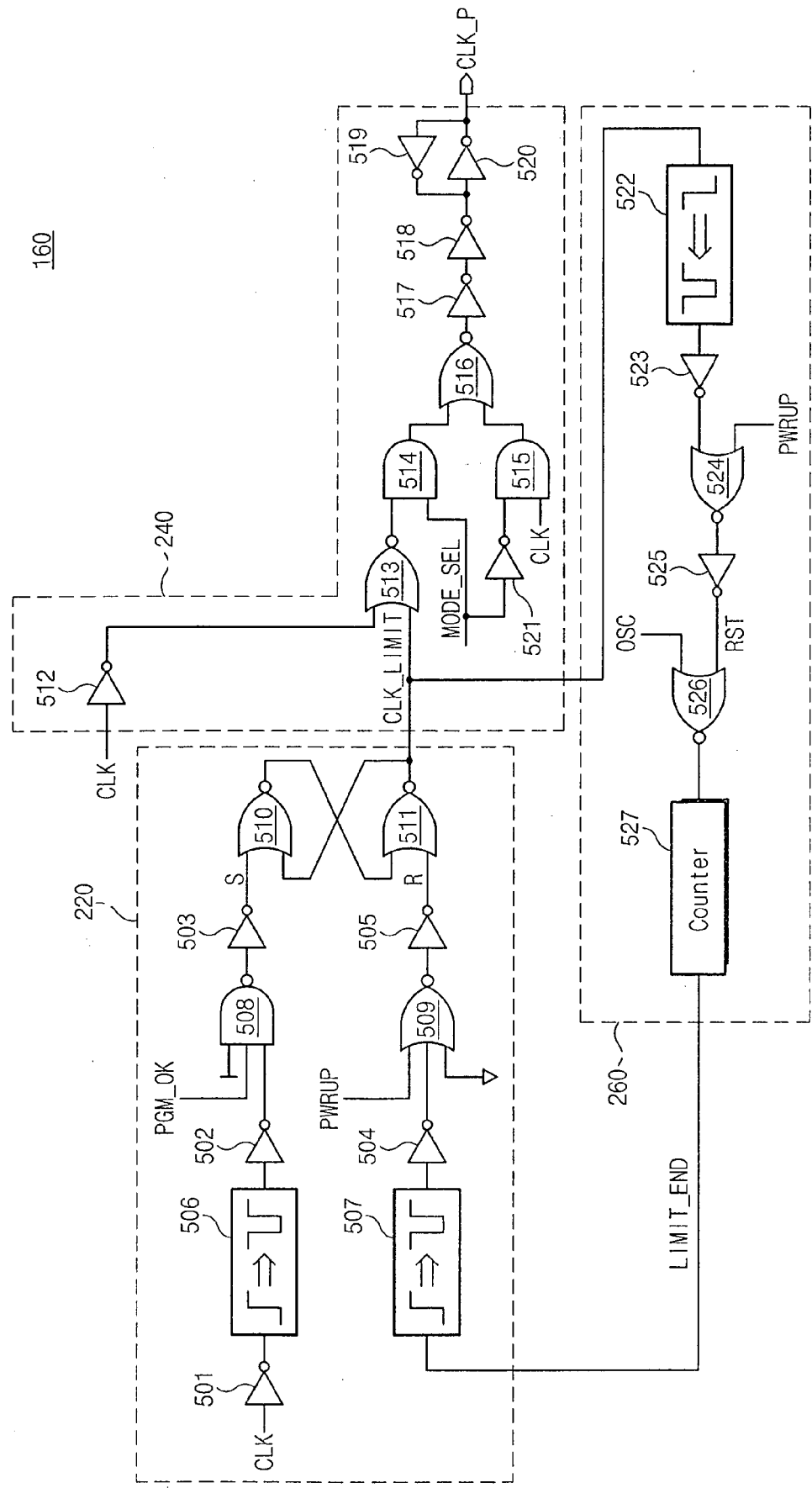
FIG. 5 is a circuit diagram showing the ripple stabilizer of FIG. 4 according to an exemplary embodiment of the present invention.

FIG. 5 is a circuit diagram showing still more detail of the ripple stabilizer of FIG. 4 in accordance with an exemplary embodiment of the present invention.

With reference to FIG. 5, the clock limit signal generating section 220 includes inverters 501, 502, 503, 504, and 505, pulse generators 506 and 507, and NOR gates 509, 510, and 511. They are connected as shown in FIG. 5. The NOR gates 510 and 511 form a latch. An output signal of the clock limit signal generating section 220 (a clock limit signal CLK_LIMIT) is reset to a low level during a power-up section or when a power-up signal PWRUP is in a high level. While a flag signal PGM_OK is maintained in a low level (the high voltage Vpgm is lower than the target voltage), a set input terminal S of the latches 510 and 511 is maintained in a low level irrespective of a transition of the clock signal CLK. While the flag signal PGM_OK is maintained in a high level (the high voltage Vpgm reaches the target voltage), the set input terminal S of the latches 510 and 511 is in a high level when the clock signal CLK is transitioned from low to high. To the contrary, the set input terminal S of the latches 510 and 511 is in a low level when the clock signal CLK is transitioned from high to low. When the limit end signal LIMIT_END is transitioned from a low level to a high level, a reset input terminal R of the latches 510 and 511 is transitioned to a high level during a predetermined time (or during an activation section of a pulse signal of a pulse generator 507). That is, the clock limit signal CLK_LIMIT is activated to a high level by the high-low transition of the clock signal CLK during an activation section of the flag signal PGM_OK. The activated clock limit signal CLK_LIMIT is inactivated to a low level by an activation of the limit end signal LIMIT_END.

With reference to FIG. 5, the switch 240 includes inverters 512, 517, 518, 519, 520, and 521, and AND gates 514 and 515. They are connected as shown in FIG. 5. While the clock limit signal CLK_LIMIT is inactivated at a low level, the clock signal CLK is outputted as the pump clock signal CLK_P through elements 512, 513, 514, 516, 518, and 519 of the switch 240. While the clock limit signal CLK_LIMIT is activated at a high level, the switch prevents the clock signal CLK from being outputted as the pump clock signal CLK_P. A control signal MODE_SEL is a signal indicating whether a clock limit function is used or not. When the control signal MODE_SEL is in a low level, an output of the AND gate 515 is maintained in a low level irrespective of an output of a NOR gate 513. That is, a signal path 514 of a clock signal CLK inputted to the inverter 512 is cuts off and to the contrary, a clock signal CLK inputted to the AND gate 515 is outputted as a pump clock signal through signal paths 515, 516, 517, 518, and 519.

The limit period computing section 260 includes a pulse generator 522, inverters 523 and 525, NOR gates 524 and 52, and a counter 527. They are connected as shown in FIG. 5. A reset signal generator is structured by the pulse generator 522, the inverters 523 and 525, and the NOR gate 524. In addition, the reset signal generator generates a reset signal RST in response to low-high transition of the clock limit signal CLK_LIMIT. The counter 527 is reset when the reset signal RST is generated as a pulse (or when the clock limit signal CLK_LIMT is transitioned from a low level to a high level). After that, the counter 527 is synchronized with an oscillation signal OSC to perform a count operation. If a count value of the counter 527 reaches a pre-setting value, the limit period computing section 260 activates the limit end signal to high. The counter can be embodied so that a target value (a set value) is changeable (programmable) or is fixed.

FIG. 6 is a timing diagram illustrating the operation of the high voltage generator circuit. As shown in FIG. 6, the oscillator 140 automatically generates an oscillation signal OSC after a power-up. However, it will be understood by those skilled in the art that the oscillator 140 can be embodied to generate the oscillation signal OSC in only specific conditions. After the power-up, as shown in FIG. 6, the high voltage Vpgm is maintained as a specific voltage (e.g., a power voltage). As previously mentioned, the clock limit signal CLK_LIMIT is reset to a lower level by the NOR gates 509 and 511 of the clock limit signal generating section 220 and the inverter 505. In this embodiment, the control signal MODE_SEL is set in a high level so as to use a clock limit function according to the present invention.

As the oscillator 140 generates the oscillation signal OSC, the high voltage generator circuit 100 starts generating the high voltage Vpgm through the following processes. At the initial time, since the divide voltage Vdvd is lower than the reference voltage (or the high voltage Vpgm is lower than the target voltage), the clock enable signal CLK_EN is activated. The clock driver 150 outputs an oscillation signal OSC as the clock signal CLK in response to the activation of the clock enable signal CLK_EN. The clock signal CLK is provided to the ripple stabilizer 160. Since the high voltage Vpgm is lower than the target voltage, the flag signal PGM_OK is maintained in a low level. As the flag signal PGM_OK has a low level, a set input terminal S of the latches 510 and 511 of the clock limit signal generating section 220 is maintained in a low level. As the clock limit signal CLK_LIMIT is maintained in a low level, the clock signal CLK outputted from the clock driver 150 is outputted as the pump clock signal CLK_P through signal paths 512, 513, 514, 516, 518, and 519 without limitation. The charge pump 110 generates the high voltage Vpgm in response to the pump clock signal CLK_P.

Through previous processes, the high voltage Vpgm is gradually increased to the target voltage as shown in FIG. 6. When the high voltage Vpgm reaches the target voltage, the flag signal PGM_OK is transitioned from a low level to a high level. As the flag signal PGM_OK has a low-high transition, a set input terminal S of the latches 510 and 511 is synchronized with a high-low transition of the clock signal CLK to be a high level. As a result, the clock limit signal CLK_LIMIT is transitioned from a low level to a high level. As the clock limit signal CLK_LIMIT becomes a high level, the switch 240 cuts off the clock signal CLK. At the same time, a reset signal RST is generated according to the low-high transition of the clock limit signal CLK_LIMIT. The counter 527 is reset by the reset signal RST and performs a count operation in response to the oscillation signal OSC.

When a count value reaches a reference value (or a set value or when a pre-set limit time passes), the limit period computing section 260 activates the limit end signal LIMIT_END to high. A reset input terminal R of the latches 510 and 511 becomes a high level according to the low-high transition of the limit end signal LIMIT_END. As result, the clock limit signal CLK_LIMIT becomes inactivated to low as shown in FIG. 6. As the clock limit signal CLK_LIMIT becomes inactivated to low, the switch 240 outputs the clock signal CLK as the pump clock signal CLK_P. The inactivated clock limit signal CLK_LIMIT is activated again in the high-low transition of the clock signal CLK so that the clock signal CLK is cut off by the switch 240. The activated clock limit signal CLK_LIMIT becomes inactivated by the limit period computing section 260 in the same manner as explained above.

As previously mentioned, when the high voltage Vpgm is lower than the target voltage (or the high voltage Vpgm has not reached the target voltage), the clock signal CLK is outputted as the pump clock signal CLK_P without limitation. To the contrary, when the high voltage Vpgm reaches the target voltage, the clock signal CLK is limitedly outputted as the pump clock signal CLK_P as much as a predetermined clock cycle every constant time period. As the pump clock signal CLK_P is regularly provided to the charge pump 110 as much as the predetermined clock cycle every constant time period, as shown in FIG. 6, it is possible to maintain, as well as to minimize, a ripple of the high voltage.

When the high voltage generating circuit 100 is applied to a non-volatile memory device, the high voltage Vpgm may be provided to a word line of memory cells to be programmed in a program operation. Comparing with a conventional high voltage generating circuit, with maintaining the ripple of the high voltage Vpgm, a threshold voltage profile of memory cells to be programmed may be controlled more densely. This means that a program performance of a non-volatile memory device is improved.

After the high voltage Vpgm reaches the target voltage, the clock signal CLK of a first clock cycle is provided to the charge pump 110 as the pump clock signal CLK_P. However, it is to be understood in those skilled in the art that the clock limit signal generating section is embodied so that the clock signal CLK of N clock cycles (where N is 2 or an integral number higher than 2) may be provided to the charge pump 110.

As previously mentioned, after the high voltage reaches the target voltage Vpgm, the clock signal CLK is limited to be provided to the charge pump 110 as the pump clock signal CLK_P only a predetermined number of clock pulses every constant time. As a result, it is possible to minimize the ripple of the high voltage.

It is noted that as shown in FIG. 6, there are two cyclical processes. The clock oscillator generates a periodic clock signal OSC. The second cyclical process is that after the voltage Vpgm initially reaches the target voltage Vt, the voltage Vpgm (called the high voltage) cyclically goes above and then falls to the target voltage. After the voltage initially reaches the target voltage, only a certain number of clock pulses are gated to the charge pump each time the voltage drops to the target voltage. The number of clock pulses gated to the charge pump each time the output high voltage drops to the target voltage can de defined as N. The value of N can be a number that is the number one or higher.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A high voltage generator circuit comprising:
   a charge pump for generating a high voltage;
   an oscillator for generating pump clock signal pulses for driving the charge pump when the high voltage is below a target voltage, the high voltage initially reaching a target voltage and thereafter the high voltage falls below the target voltage cyclically, once in a cycle; and
   a pump clock generator block circuit for limiting the transmission of the pump clock signal pulses to the charge pump to only N pump clock signal pulses per the cycle, where N is a predetermined integer.

2. The high voltage generator circuit of claim 1, wherein after the high voltage reaches the target voltage, the pump clock generator block circuit limits the transmission of the pump clock signal pulses to the charge pump to only one pump clock signal pulses per cycle.

3. The high voltage generator circuit of claim 2, wherein when the high voltage has not initially reached the target voltage, the transmission of the pump clock signal pulses is not limited.

4. The high voltage generator circuit of claim 1, wherein the pump clock generator block circuit limits the transmission of the pump clock signal pulses so that only one pump clock signal pulse is outputted to the charge pump when the high voltage is lower than the target voltage.

5. The high voltage generator circuit of claim 1, wherein the pump clock generator block circuit is structured so that the transmission limitation of the pump clock signal pulses is programmable.

6. A high voltage generator circuit comprising:
   a charge pump for generating a high voltage in response to receiving pump clock pulses;
   a clock enable signal generator for generating a clock enable signal according to whether the high voltage is lower than a reference voltage;
   a clock driver for outputting oscillation signal pulses as clock pulses in response to the clock enable signal; and
   a ripple stabilizer including a counter that counts the oscillation signal pulses, the ripple stabilizer for outputting a limited number of the clock pulses to the charge pump, the limited number of the clock pulses being the pump clock pulses, after the counter counts a predetermined number of the oscillation signal pulses.

7. The high voltage generator circuit of claim 6, wherein after the high voltage reaches the target voltage, the ripple stabilizer limits the number of clock pulses to only one.

8. The high voltage generator circuit of claim 7, wherein until the high voltage reaches the target voltage, the number of clock pulses is not limited.

9. The high voltage generator circuit of claim 6, wherein the ripple stabilizer is structured so that the limit on the number of clock pulses is programmable.

10. The high voltage generator circuit of claim 6, wherein the ripple stabilizer limits the number of clock pulses when the high voltage is lower than the target voltage.

11. The high voltage generator circuit of claim 6, wherein the ripple stabilizer includes:
    a clock limit signal generating section for generating a clock limit signal synchronized with the oscillation signal pulses according to whether the high voltage reaches the target voltage; and
    a switch for selectively outputting the clock pulses as the pump clock pulses in response to the clock limit signal.

12. The high voltage generator circuit of claim 11, wherein the ripple stabilizer further includes a limit period computing section for generating a limit end signal in response to the clock limit signal, and
    wherein the clock limit signal is inactivated when the limit end signal is activated.

13. The high voltage generator circuit of claim 12, wherein when the clock limit signal is inactivated, the switch outputs the clock pulses as the pump clock pulses without limitation.

14. The high voltage generator circuit of claim 13, wherein the limit end signal is activated after the clock limit signal is activated and a predetermined time passes.

15. The high voltage generator circuit of claim 12, wherein when the clock limit signal is activated, the switch limits the clock pulses to be cyclically outputted as much as a first clock cycle.

16. The high voltage generator circuit of claim 11, wherein the switch is structured to output the clock pulses as the pump clock pulses irrespective of the clock limit signal according to a signal indicating whether a clock limit function is in use.

17. A method for generating a high voltage, the method comprising:
    generating a pump clock signal, comprising pulses, according to whether the high voltage reaches a target voltage; and
    generating the high voltage in response to the pump clock signal;
    after the high voltage reaches the target voltage, limiting the pump clock signal to be cyclically generated, so there are a limited number of pulses per cycle.

18. The method of claim 17, wherein when the high voltage has not reached the target voltage, the pump clock signal is not limited.

19. The method of claim 17, wherein the pump clock pulses are outputted only during a first clock cycle whenever the high voltage is lower than the target voltage.

20. A high voltage generator circuit comprising:
    an oscillator to generate a pump clock signal comprising a plurality of pulses;
    a charge pump for generating a high voltage upon receiving the pulses;
    a comparator circuit to determine if the charge pump is generating a target high voltage;
    a counter circuit to determine a limit period after the comparator circuit has determined that the charge pump is generating a voltage at or above the target high voltage; and
    a pump clock generator block circuit to prevent the charge pump from receiving the pulses during the limit period, and to transmit an N number of the pulses to the charge pump at the end of each limit period.

21. The high voltage generator circuit of claim 20, wherein the charge pump generates the voltage equal to the target high voltage once per the limit period.

22. The high voltage generator circuit of claim 20, wherein the counter circuit is programmable so that the limit period is changeable.

23. The high voltage generator circuit of claim 20, wherein the voltage is cyclic with a period equal to the limit period.

24. A high voltage generator circuit comprising:
    a charge pump for generating a high voltage in response to a pump clock signal;
    a ripple stabilizer having a first mode of operation in which the charge pump is supplied with the pump clock signal and a second mode of operation in which the charge pump is prevented from receiving the pump clock signal;
    a clock driver to supply the ripple stabilizer with the pump clock signal in response to a clock enable signal; and
    a comparator to generate the clock enable signal according to whether the high voltage is lower than a target voltage,
    wherein the ripple stabilizer includes
        a switch circuit to output the pump clock signal in response to a clock limit signal in the first mode,
        a clock limit signal generating circuit to generate the clock limit signal using a latch circuit, and
        a counter that is reset by the clock limit signal, the counter to determine a time period for which the switch circuit outputs the pump clock signal in the first mode, wherein the latch circuit is responsive to the counter.

* * * * *

UNITED STATES PATENT AND TRADEMARK OFFICE
CERTIFICATE OF CORRECTION

PATENT NO.        : 7,215,181 B2
APPLICATION NO. : 11/025765
DATED              : May 8, 2007
INVENTOR(S)       : Wook-Ghee Hahn et al.

It is certified that error appears in the above-identified patent and that said Letters Patent is hereby corrected as shown below:

Column 3, line 56, the words "not, That" should read -- not. That --;
Column 4, line 10, the word "CLK_EN" should read -- CLK_EN, --;
Column 4, line 14, the word "11G." should read -- FIG. --.

Signed and Sealed this

Twenty-sixth Day of August, 2008

JON W. DUDAS
*Director of the United States Patent and Trademark Office*